United States Patent
> Liebe, Jr.

[15] 3,660,212

[45] May 2, 1972

[54] PLASTIC ATHLETIC LETTERING MATERIAL AND PROCESS FOR MANUFACTURING SAME

[72] Inventor: Robert James Liebe, Jr., 7 Middlebrook, Creve Coeur, Mo. 63141

[22] Filed: July 17, 1969

[21] Appl. No.: 842,476

[52] U.S. Cl. ............................. 161/41, 161/40, 161/166, 161/251, 161/254, 161/406
[51] Int. Cl. ................. B32b 7/06, B32b 27/10, B32b 27/30
[58] Field of Search ................... 161/40, 254, 249, 166, 41, 161/251, 406

[56] References Cited

UNITED STATES PATENTS

| | | | |
|---|---|---|---|
| 2,569,398 | 9/1951 | Burd et al. | 161/249 |
| 2,647,849 | 8/1953 | Douglas et al. | 161/249 |
| 2,706,699 | 4/1955 | Plansoen et al. | 161/254 |
| 2,835,621 | 5/1958 | Braun et al. | 161/249 |
| 3,169,088 | 2/1965 | Wetterau | 161/254 |
| 3,186,889 | 6/1965 | Boldrini et al. | 161/54 |
| 3,415,288 | 12/1968 | Marshack | 161/254 |

*Primary Examiner*—John T. Goolkasian
*Assistant Examiner*—George W. Moxon, II
*Attorney*—Jerome A. Gross

[57] ABSTRACT

Flexible plastic sheet material is provided from which pigmented letters, designs and the like may be cut for fusing to fabrics. A liquid pigmented mass of heat curable plastic, for example, plastisol, is knife-spread on a high gloss release sheet and heat cured, to serve as the outer, pigmented side of the sheet material to be formed. An unpigmented preformed flexible thermoplastic sheet, whose fusing temperature is lower than the temperature of heat curing, is pressed to the newly cured, hot pigmented film and fused to it; this thermoplastic serves as the inner adherent side of the material. Letters and designs cut from such material may be ironed onto fabric, utilizing heat sufficient to raise the inner, thermoplastic side to fusing temperature without affecting the outer, pigmented side.

3 Claims, 3 Drawing Figures

Inventor
ROBERT JAMES LIEBE JR.

By Jerome A. Crow
Attorney

PLASTIC ATHLETIC LETTERING MATERIAL AND PROCESS FOR MANUFACTURING SAME

BACKGROUND OF THE INVENTION

This invention relates to the small quantity manufacture of pigmented flexible plastic sheet material from which cut-outs may be made, for example, letters and designs, for ironing onto athletic garments.

Conventionally, expensive fabric materials are used, which must be sown to the garments. Alternately, letters and designs on such garments may be silk screened, with results which do not compare in richness and color with the fabric letters.

Plastic letters and designs for garments have not heretofore been in widespread use. Conventional processes for manufacturing plastic sheets are not well adapted for making athletic letters, because these manufacturing processes are suited only for large scale production. In contrast, the commercial demand for athletic letters requires only a small amount of material, in many standardized colors.

SUMMARY OF THE PRESENT INVENTION

The present invention provides, in desired small quantities, flexible plastic sheet material for pigmented letters and designs, suitable for fusing to fabrics. The present method is uniquely suited to small scale production, so that the material may be produced in the great variety of colors required for use on athletic garments. The plastic material manufactured by the present process is a composite, having one richly pigmented side, heat cured at an elevated temperature, for example, 450° F. Its opposite side is thermoplastic, and its fusing temperature is much less, for example 300° F. In use, the thermoplastic surface serves as the inner surface, applied onto a fabric garment. Heat applied to the outer, pigmented side will, without damage to it, penetrate it and raise the thermoplastic side to fusing temperature so that the fused thermoplastic material will bind to the fibres of a garment.

Generally summarizing the process, whose preferred embodiment is described hereafter, a liquid pigmented mass is first compounded of a plastic, such as plastisol, which when spread on a sheet of release paper and heat cured at a temperature greater than the fusing temperature of a pre-selected thermoplastic film, will form an almost rubber-like flexible film on the release paper. While still hot, this rubber-like heat-cured film is presented against the surface of a preferably unpigmented, preformed flexible thermoplastic film whose fusing temperature is less than the then temperature of the heat-cured film. The two films are pressed together; the heat of the pigmented film fuses the thermoplastic film to it, uniting the two so as to form the new flexible sheet material.

DESCRIPTION OF THE PREFERRED EMBODIMENT

Figure 1:
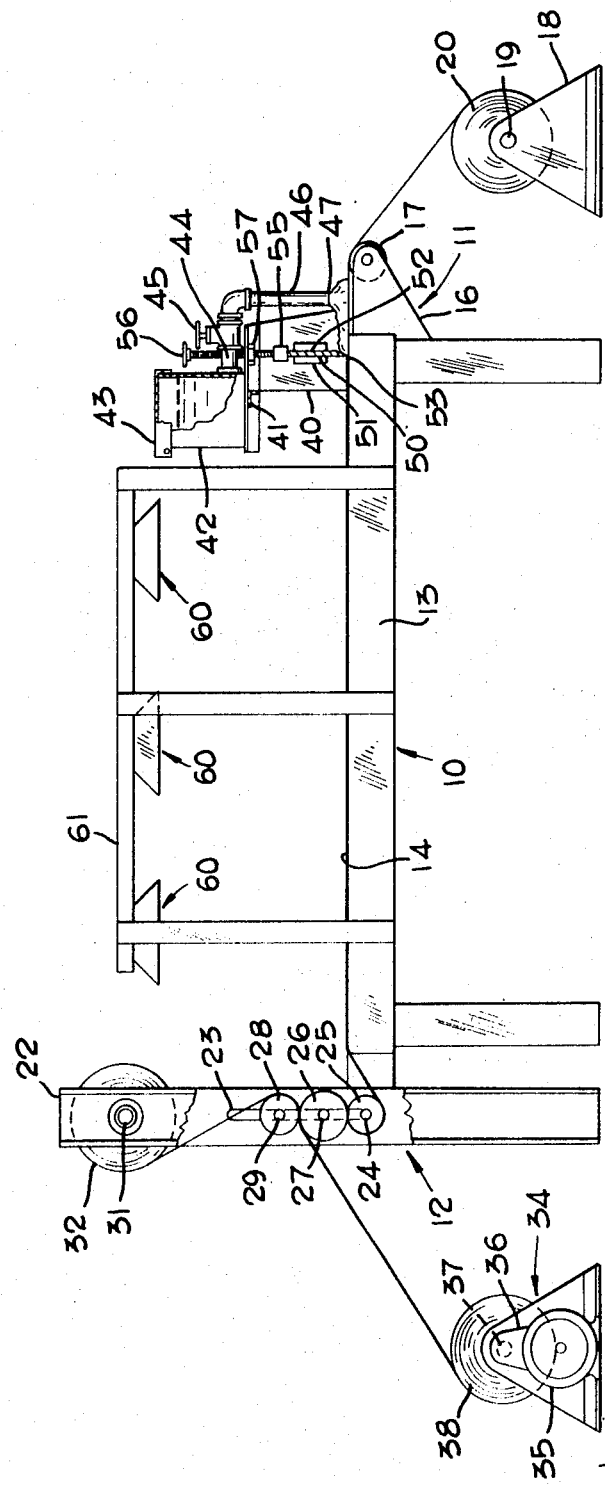
FIG. 1 is a side elevation, partly broken away, of apparatus by which the present invention is practiced.
Figure 2:
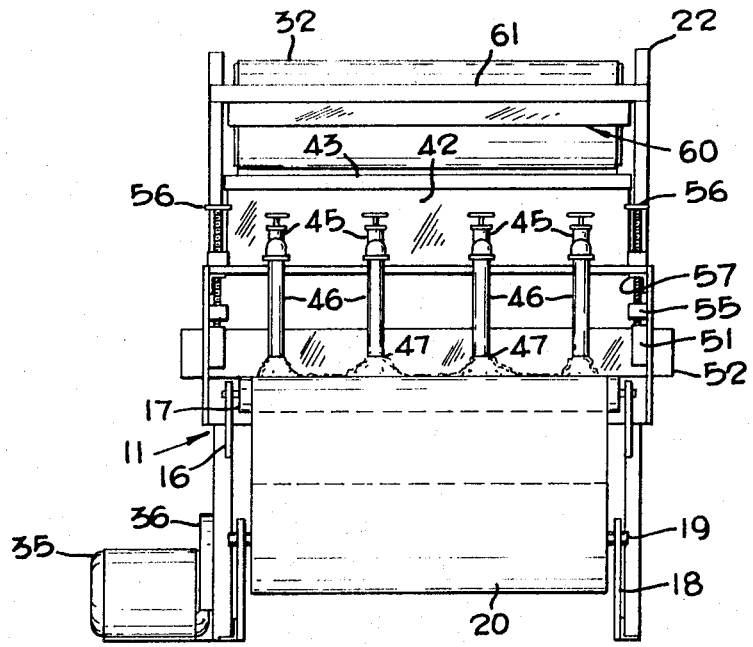
FIG. 2 is a right end view thereof.
Figure 3:
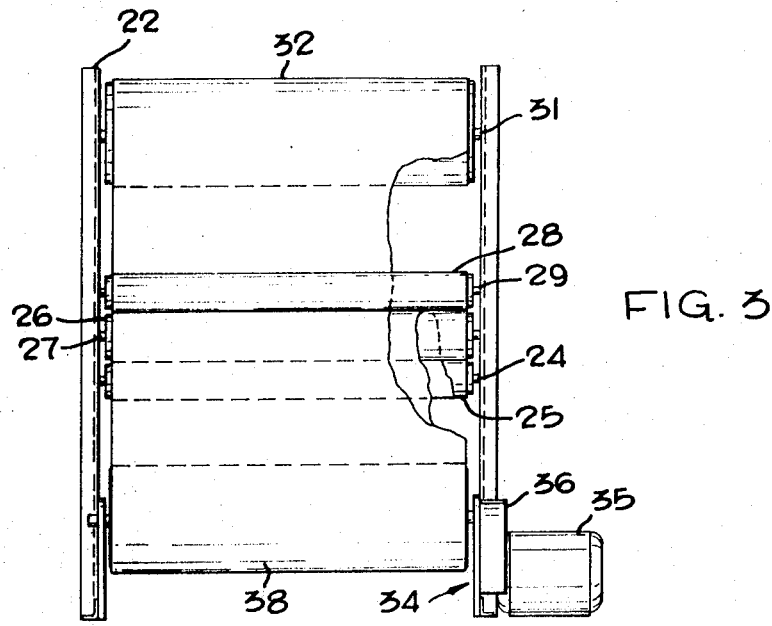
FIG. 3 is a left end view thereof.

A preferred form of apparatus, by which the present invention may be practiced, is shown, partly schematically, in the drawings. A table, generally designated 10 and best seen in FIG. 1, includes at the right end thereof, feed end support framing generally designated 11, and at the left end thereof, discharge end support framing generally designated 12. Intermediate horizontal framing 13 supports a horizontal table surface 14.

The feed and support framing 11 includes a pair of roller brackets 16 holding a table edge feed guide roll 17. A feed roll cradle 18, which may be positioned on the floor adjacent to and beneath the feed guide roll 17, includes a spindle 19 on which is mounted a release paper supply roll 20. The texture of the paper on the roll 20 is such that its uppermost surface, fed onto the table surface 14 over the feed guide roll 17, is a smooth high gloss surface.

The discharge end support framing 12 includes a pair of upright channels 22, one on each side. Each of the channels 22 has a vertical slot 23 which extends from a point below the level of the table surface 14, upward sufficiently to receive three rollers, hereafter described. Supported by and within the lower ends of the slots 23 is the shaft 24 of a smooth steel lowermost roller 25; the level of the shaft 24 is preferably slightly below that of the table surface 14. Resting on the lowermost roller 25 is an intermediate rubber roller 26 whose shaft 27 is restrained by the side edges of the slot 23. Resting on the rubber roller 26 is an upper steel roller 28, similarly having its shaft 29 restrained by the slot 23.

Spacedly above the upper steel roller 28, the upright members 22 support the removable shaft 31 of a thermoplastic film supply roll 32. Beyond the discharge end framing 12, a motorized roll cradle generally designated 34 and powered by an electric motor 35 and gear reducer drive 36, receives and coils upon its spindle 37 a roll 38 of the product to be produced.

At the feed end, a pair of rigid support brackets generally designated 40 rise from the feed end support framing 11 just inwardly of the feed end of the table surface 14. At their left, or inner, upper side the brackets 40 support a transverse angle 41, best seen in FIG. 1, on which is mounted a rectangular sheet metal box-like reservoir 42 having a hinged cover 43. Projecting from the reservoir 42 near its bottom and extending toward the feed end of the table 10, are feed pipes 44 having valves 45 which feed through downward extension tubes 46 to spreader outlets 47.

Each of the brackets 40 has, leading upward from its lower end, a vertical slot 50 flanked by guide bars 51 between which a spreader knife blade 52 is mounted by mechanism which adjustably positions its knife edge 53 a precise distance above the horizontal table surface 14. Simple mechanism for such adjustment may include socket members 55, mounted on the upper edge of the knife 52, which are raised and lowered by turning vertical hand screws 56 whose conventional lower ball-like ends (not shown) are received within the socket members 55 and whose intermediate threaded portions adjustably engage internally threaded nuts 57 welded onto the support brackets 40.

The extension tubes 46 from the reservoir valves 45 are designed to spread material from the reservoir 42 along a laterally extending line just outward of the knife 52. On the other side of the knife 52, extending over the intermediate framing 53, are mounted a plurality of heat lamps generally designated 60. These are supported laterally above the horizontal table surface 14 by lamp support framing 61. The heat lamps 60 are of a type conventionally used for heat curing, and are powered by a source of electricity, not shown.

As best seen in FIG. 1, high gloss release paper is drawn from the supply roll 20 over the feed guide roll 17, to the left across the horizontal table surface 14, thence under and around the lower most steel roll 24, back above it and below the intermediate rubber roll 26, and then again to the left over the rubber roll 26 and beneath the upper steel roll 28. The thermoplastic film supply roll 32 feeds a thermoplastic film as will be described, to the right above the uppermost steel roll and then beneath it to the left, in contact with the film coating formed, as hereafter described, on the release paper. Together they travel to the right and downward to be wound as the product roll 38.

The present process of manufacture, using the apparatus above described, is described in the preferred embodiment of manufacturing steps set forth below.

The thermoplastic film supply roll 32 consists of preformed film of the type which, when heated to a fusing temperature, melts or softens; and when cooled, again hardens. The softening or fusing temperature of the preferred thermoplastic film is approximately 300° F., and its thickness is substantially 5 mils or greater. Preferably it is unpigmented. At the fusing temperature, it becomes a gel-like, so that when pressed against the fibers of the fabric, it will penetrate and bind to them.

For use with such a thermoplastic film, I prefer to form the heat curable plastic to a film of approximately equal thickness, say 5 mils or greater, using a plastisol or other heat curable plastic mixture which cures at a temperature of approximately 450° F. There is a consistency in structural properties between a heat curable plastic of the plastisol type, curable at approximately 450° F., and a preformed thermoplastic film of the polyvinyl chloride type, having a fusing temperature of approximately 300° F., in the respects that the flexibility of the plastisol film is more than ample, and it will not melt or be damaged when the thermoplastic film is subsequently raised to fusing temperature. Thus, when the two bind together, using the present process, they are united into a substantially integral flexible sheet material heat-cured at its pigmented side, the other side having a fusing temperature so low that it can be fused without damage to the pigmented side.

As will be obvious, the thermoplastic film may, if desired, be supplied with one surface covered by a paper backing sheet. Film from the supply roll 32 passes between the upper steel roller 28 and the intermediate rubber roller 26, with its exposed thermoplastic surface presented downward, for contact with the still warm, heat-cured film formed on the release paper, as now to be described.

The pigmented mixture, liquid at room temperature, is made up of a plastisol or other plastic of a type which, when heat-cured, will form a flexible film. This plastic is selected so that the temperature at which it heat cures will be substantially above that temperature pre-selected for fusing the final material to fabrics. A liquid mass of such pigmented mixture, in a desired color, is compounded and placed in the reservoir 42.

With the heat lamps 60 energized by a source of electric current, not shown, the reservoir valves 45 are opened, to permit slow flow of the liquid mass from the reservoir 42 in front of the knife 52, as shown in FIG. 1. The height of the knife edge 53 is so adjusted, by the mechanism heretofore described, to spread the liquid thermoplastic mass emerging from the spreader outlets 47 in a uniform thin film of say 5 mils in thickness.

The power of the motorized cradle 34 draws the release paper under the edges 53 to spread pigmented plastic thereon, beneath the heat lamps 40, which heat it to curing temperature, in this instance, 450° F.; and the rate of travel along the table surface 14 is sufficiently slow to permit completion of the curing operation. The cured film on its release paper is then drawn below and around the lowermost roller 25. As it reaches the top of the roller 25, the newly cured film surface is pressed evenly against the roller surface by the weight of the overlaying rubber roller 26 and upper steel roller 28; and any entrained air and surface variations are pressed out. Meantime the film, cured at 450° F., will have somewhat cooled, but its temperature will still be at least as great as the 300° F. fusing temperature of the thermoplastic film descending from the supply roll 32. Accordingly, when the newly cured film reaches the top of the rubber roller 26, the still hot surface will contact the thermoplastic film, raising its temperature to its 300° F. fusing point. Thus under heat and the pressure of the upper steel roller 28, the two films are united to form the desired unitary flexible sheet material product 38, which is progressively coiled by the motorized cradle 34.

For use on garments, as athletic letters and designs or for other purposes, cut-outs are made from the roll of product 38. The thermoplastic side is presented against the surface of the garment; and a hot iron is applied to the release paper covering the pigmented side. The heat will penetrate through the heat-curable side of the film without damaging it in any way, but raising the thermoplastic side to fusing temperature and causing it to flow or become gel-like, and to bind to the fibers of the fabric. The hot iron is then removed, and a release paper stripped from the pigmented surface.

Colored letters and designs, so applied, are clear and rich looking. They are highly flexible, and do not deteriorate rapidly when the garment is used, but withstand wear and laundering.

Variations in the process described may be advantageous for certain purposes. For example, at start-up the rollers 24, 26, 28 may be preliminarily heated, so that they do not absorb so much heat as to prevent adequate fusing of the initial portion of the sheet material being produced. Similarly, if before the two films are pressed together, the temperature of the heat-cured pigmented film has been permitted to drop below the fusing point of the thermoplastic film, additional heat may be supplied, either in advance of their being joined between the rollers 26, 28 or by heating the steel roller 28.

I claim:

1. A colored letter or design for adhering to fabric, garments and the like comprising:
   a release sheet;
   a first layer consisting essentially of a pigmented flexible solid polyvinyl chloride plastic layer releasably adhered to said release sheet;
   and a second layer consisting essentially of a flexible solid polyvinyl chloride plastic pre-formed sheet material, said second layer being unpigmented, bonded to said first layer, coextensive therewith, and having a melting point substantially lower than that of said first layer.

2. A colored letter or design according to claim 1 wherein said release sheet comprises paper.

3. A colored letter or design according to claim 1 wherein said unpigmented sheet is heat-bonded to said pigmented sheet.

* * * * *